(12) United States Patent
Nagl et al.

(10) Patent No.: US 6,202,576 B1
(45) Date of Patent: Mar. 20, 2001

(54) PROCESS FOR RECYCLING FINE-PARTICLE SOLIDS DISCHARGED FROM A REACTOR VESSEL WITH A GAS

(75) Inventors: Michael Nagl, Reichenau; Johannes Schenk, Linz; Josef Stockinger, Leonding, all of (AT)

(73) Assignee: Deutsche Voest-Alpine Industrieanlagenbau GmbH, Dusseldorf (DE)

( * ) Notice: Subject to any disclaimer, the term of this patent is extended or adjusted under 35 U.S.C. 154(b) by 0 days.

(21) Appl. No.: 09/068,127

(22) PCT Filed: Oct. 30, 1996

(86) PCT No.: PCT/AT96/00209

§ 371 Date: May 1, 1998

§ 102(e) Date: May 1, 1998

(87) PCT Pub. No.: WO97/16244

PCT Pub. Date: May 9, 1997

(30) Foreign Application Priority Data

Nov. 2, 1995 (AT) .................................................. 1812/95

(51) Int. Cl.⁷ ................................ F23J 3/00; B65G 53/60
(52) U.S. Cl. ..................... 110/342; 110/348; 110/216; 110/245; 110/266; 431/7; 406/173; 55/340
(58) Field of Search ......................... 110/229, 165 A, 110/165 R, 245, 259, 266, 342, 344, 348, 216; 406/173; 55/338, 339, 340; 96/143; 431/7

(56) References Cited

U.S. PATENT DOCUMENTS

| | | | |
|---|---|---|---|
| 4,117,786 | * 10/1978 | Brose | 110/229 |
| 4,419,965 | * 12/1983 | Garcia-Mallol et al. | 110/245 X |
| 4,453,497 | * 6/1984 | Davis | 110/245 X |
| 4,679,511 | * 7/1987 | Holmes et al. | 110/216 |
| 4,688,521 | * 8/1987 | Korenberg | 110/245 X |
| 4,700,636 | * 10/1987 | Vogt et al. | 110/245 X |
| 4,734,110 | * 3/1988 | Premel et al. | . |
| 4,781,574 | * 11/1988 | Taylor | 110/266 X |
| 4,824,360 | * 4/1989 | Janka et al. | 431/7 |
| 4,838,898 | * 6/1989 | Mifflin et al. | 110/165 A X |
| 4,977,837 | * 12/1990 | Roos et al. | 110/165 A |
| 5,110,323 | 5/1992 | Soni | 55/1 |
| 5,154,732 | * 10/1992 | Hakulin et al. | 110/245 X |
| 5,159,886 | * 11/1992 | Schaub et al. | 110/245 X |
| 5,584,255 | * 12/1996 | Bishop et al. | 110/235 |
| 5,706,884 | * 1/1998 | Klaren | 110/245 X |

FOREIGN PATENT DOCUMENTS

| | | | |
|---|---|---|---|
| 0278287 | 8/1990 | (EP) . | |
| 0245268 | 11/1990 | (EP) . | |
| 0493752 | 7/1992 | (EP) . | |
| 0599760 | 6/1994 | (EP) . | |
| 2 203 672 | * 10/1988 | (GB) | 110/245 |
| 4-43211 | * 2/1992 | (JP) | 110/245 |

* cited by examiner

Primary Examiner—Carl D. Price
Assistant Examiner—Ljiljana V. Ciric
(74) Attorney, Agent, or Firm—Ostrolenk, Faber, Gerb & Soffen, LLP

(57) ABSTRACT

In a process for recycling fine-particle solids (4) discharged from a reactor vessel (1) at a discharging position of the reactor vessel (1) by means of a gas, at a recycling position (16) of the reactor vessel (1), the solids (4) are separated in a solids separator (3) and subsequently collected in a collecting vessel (8) and from the same are recycled into the reactor vessel (1) by means of a conveying gas.

To enhance the operation of the solids separator (3), but without causing an additional load on the reactor vessel (1), an additional gas stream (23) independent of the gas stream in the reactor vessel is conducted through the solids separator (3) in a circuit, in the direction of flow of the solids (4).

20 Claims, 2 Drawing Sheets

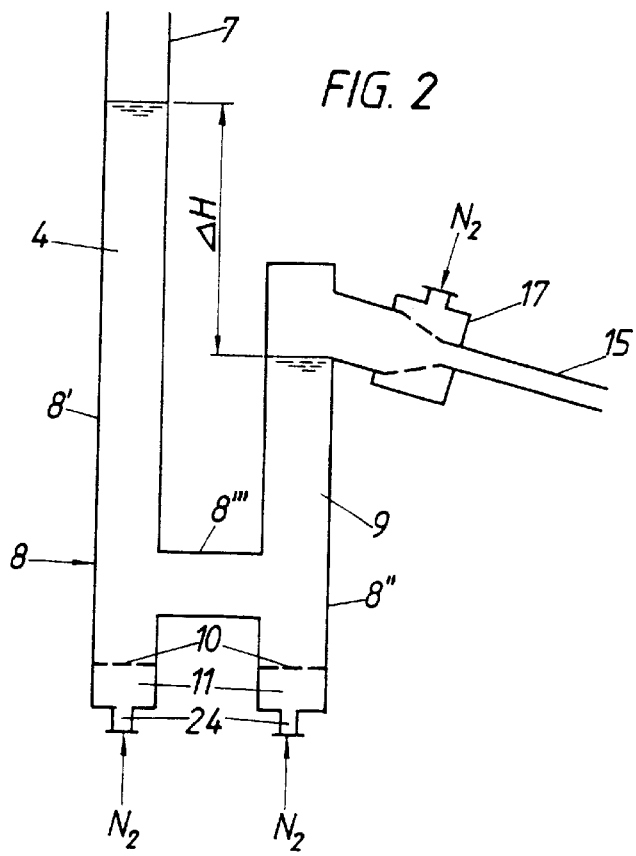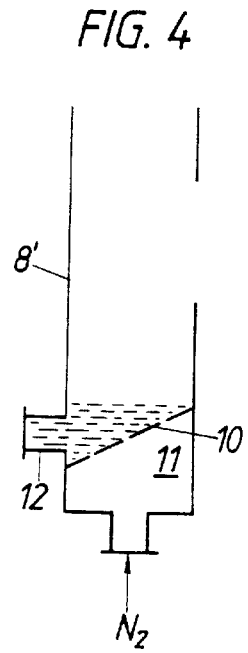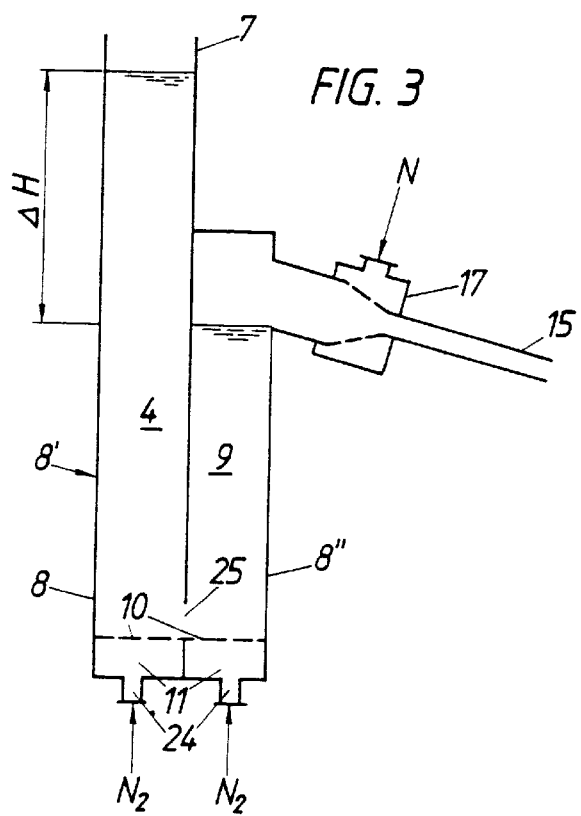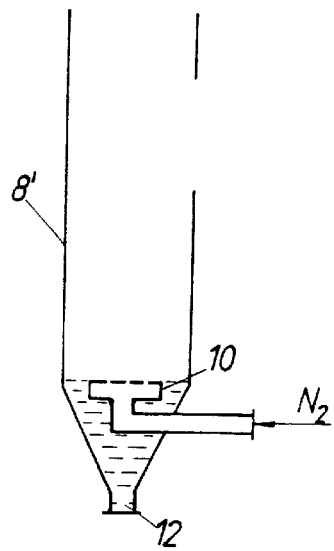

PROCESS FOR RECYCLING FINE-PARTICLE SOLIDS DISCHARGED FROM A REACTOR VESSEL WITH A GAS

BACKGROUND OF THE INVENTION

The invention relates to a process for recycling fine-particle solids, such as coal dust, discharged from a reactor vessel, particularly from a melter gasifier, at a discharging position of the reactor vessel by means of a gas, at a recycling position of the reactor vessel, wherein the solids are separated in a solids separator, particularly a cyclone, subsequently collected in a collecting vessel and from the same are recycled into the reactor vessel by means of a conveying gas while maintaining a difference in pressure between the solids separator and the recycling position and an arrangement for carrying out the process.

From EP-A - 0 493 752 it is known to separate hot dusts from a gasification reactor, such as a melter gasifier, in a cyclone and in order to surmount a difference of pressure between the cyclone and the gasifier recirculate them via a sluice system, namely via a burner. The known sluice system is very expensive in construction, the mechanically operated sluices being moreover exposed to substantial wear by the dustlike solids.

From EP-B - 0 278 287 a process of the initially described kind is known. Here, the solids incurring in the solids separator after separation from the offgas carried out of the reactor vessel are collected in a collecting vessel, wherein between the separator, which is constructed as a cyclone, and the collecting vessel the pressure is lowered to a level equal to the lowest pressure in the solids separator or optionally lower than this pressure by effecting gas exhaustion at a distance from the separator. Although this process offers the advantage that the solids leaving the solids separator can flow into the collecting vessel freely, since between the solids separator and the collecting vessel there is no upward gas flow that would hamper the movement of the solid particles, it still involves the disadvantage that due to the lower pressure offgas from the reactor vessel passes through the cyclone and together with the recycled solids is recycled into the same again, such that processes taking place in the reactor vessel are disturbed or at least are less efficient due to the recycling of already spent gases.

From EP-B - 0 245 268 it is known to conduct the flue gases emerging from a reactor vessel to a cyclone separator, which then recycles separated solid particles into the reactor vessel again. A portion of the solid particles is discharged from the cyclone separator by suction separately from the rest of the solid particles along with flue gas and recycled into the reactor vessel separately. Here, too, in addition to recycling of the solid particles recycling of a considerable portion of the flue gas into the reactor occurs, which in turn increases the gas throughput through the reactor of gas portions that are inert with regard to the reactions taking place in the reactor and entails a lower efficiency of the processes taking place in the reactor.

The invention aims at avoiding these disadvantages and difficulties and has as its object to enhance the functioning of the solids separator and recirculate the solids into the reactor in a stable conveying condition, wherein there is to be avoided on the one hand an additional load on the reactor vessel due to reactor offgas already spent in the reactor in the course of different reaction processes or, on the other hand, if a specific product gas is to be produced in the reactor, a yield loss in terms of product gas.

SUMMARY OF THE INVENTION

In a process of the initially described kind this object is achieved in accordance with the invention in that an additional gas stream independent of the gas stream in the reactor vessel is conducted through the solids separator in a circuit, in the direction of flow of the solids.

The additional gas stream—which is only conducted through the solids separator and after passing through the solids separator is discharged from the solids separator in the exit area of the solids and is conducted to the entry area of the solids into the solids separator again—renders it feasible on the one hand that gas does not flow through the solids separator in counterflow to the passage of the solids and thus cannot hamper the separation processes taking place in the solids separator and on the other hand to enhance the separating efficiency by the existence of a small gas flow oriented in the flowing direction of the solids, wherein, however, recycling into the reactor vessel of gas that has been supplied to the solids separator from the reactor vessel can be reliably avoided.

Preferably, the additional gas stream is produced by means of a pressure gas according to the injector principle, wherein suitably in the exit area of the solids from the solids separator gas for the additional gas stream is sucked off and this gas together with the pressure gas is supplied to the solids separator directly, i.e. by a short route, along with the gas that originates in the reactor vessel and is loaded with solids.

According to a preferred embodiment, in the exit area of the solids separator killing of the particles of the solid matter is effected in a killing space and that the gas for the additional gas stream is sucked out of the killing space to a large extent free from solid particles, whereby it becomes feasible to effect an almost complete separation of the solids and avoid conducting them through the solids separator again by means of the additional gas stream.

To balance the pressure loss on the way from the discharging position up to the recycling position into the reactor vessel, suitably in the collecting vessel that serves for collecting the separated solids, a fluidized bed is maintained, wherein advantageously the freshly supplied solids are charged into the fluidized bed in a lower area of the same—analogously to the action of a siphon.

Preferably, the solids separated in the solids separator are charged into the reactor vessel via a burner, wherein suitably the ash of the solids is agglomerated by combusting the solids. Hereby it becomes feasible to prevent the recycled solids from being carried out of the reactor vessel once again by means of the gases streaming out of the same. The agglomerated ash particles are no longer entrained so easily by the gases streaming upward inside the reactor vessel but will sink to the bottom of the reactor vessel and can be withdrawn there, for example in the molten state or incorporated into a slag.

Advantageously, the solids from the fluidized bed are supplied to the burner by a conveying gas. Hereby it becomes feasible to convert the solids to be recycled into an easily conveyable stable gas/solids suspension by means of the conveying gas and the fluidizing gas that forms the fluidized bed. Hereby the burner is charged with solids in a continuous manner, wherein a high conveying velocity can be achieved at an appreciable pressure loss. This is advantageous inasmuch as pressure fluctuations within the reactor vessel hardly influence the conveying condition.

An arrangement for carrying out the process according to the invention, comprising a reactor vessel, particularly a melter gasifier, a gas discharge duct departing from the reactor vessel and leading to a solids separator, particularly a cyclone, attached to a solids discharge duct conducting the separated solids to a collecting vessel, and comprising a solids recycling duct that departs from the collecting vessel and opens into the reactor vessel is characterized in that a gas circulating duct is connected in parallel with the solids separator provided with a gas injector that sucks off gas from the solids separator and conducts it back into the solids separator, namely in the direction of flow of the solids in the solids separator.

To avoid recycling of solid particles into the solids separator by means of the additional gas stream, advantageously an exit area of the solids from the solids separator is provided with a killing space into which a solids discharge duct of the solids separator opens, the mouth being arranged in the interior of the killing space, and that a gas suction unit of the gas circulating duct departs from the killing space at a distance above the mouth.

In order to surmount the pressure loss occurring on the way from the discharging position up to the recycling position into the reactor vessel, advantageously, into the collecting vessel there opens a pressure gas duct producing a fluidized bed within the collecting vessel and the solids discharge duct departing from the solids separator opens into the lower area of the fluidized bed.

According to a preferred embodiment, the collecting vessel is at its bottom provided with a bottom opening that can be shut off by means of a shut-off device and conducts into a sluicing-out vessel, with the bottom of the collecting vessel being constructed such as to taper conically from the top downward toward the bottom opening. This served for sluicing out coarse particles, such as f.i. particles chipped off from the refractory lining of the solids separator, from the collecting vessel during operation, such that the fluidized bed can be maintained in the collecting vessel without any disturbances and recycling of the solids does not have to be interrupted.

Advantageously, the solids recycling duct is provided with an admixing means for the conveying gas, wherein suitably the solids recycling duct is provided with a burner at the mouth leading into the reactor vessel.

A preferred embodiment is characterized in that the collecting vessel is provided with two tube-shaped vertical vessel parts of different lengths, which in the vicinity of their lower ends are flow-connected with each other, wherein suitably at the lower end regions of the vessel parts there ends one gas feed duct each for a fluidizing gas.

Preferably, the superficial velocities in the vessel parts are different. This enables taking into account the fluidized beds of different heights contained in the tube-shaped vertical vessel parts of different lengths—technically, the difference in heights may be as much as several meters—in an advantageous manner. The fluidized beds are operated with different superficial velocities and thus different amounts of gas.

Here, advantageously the collecting vessel is constructed in the shape of an H, with the vertical vessel parts being connected by a horizontal vessel part.

BRIEF DESCRIPTION OF THE DRAWINGS

FIGS. 2 to 5 show a detail of FIG. 1, each in a modified embodiment.

DESCRIPTION OF THE PREFERRED EMBODIMENTS

Figure 1:
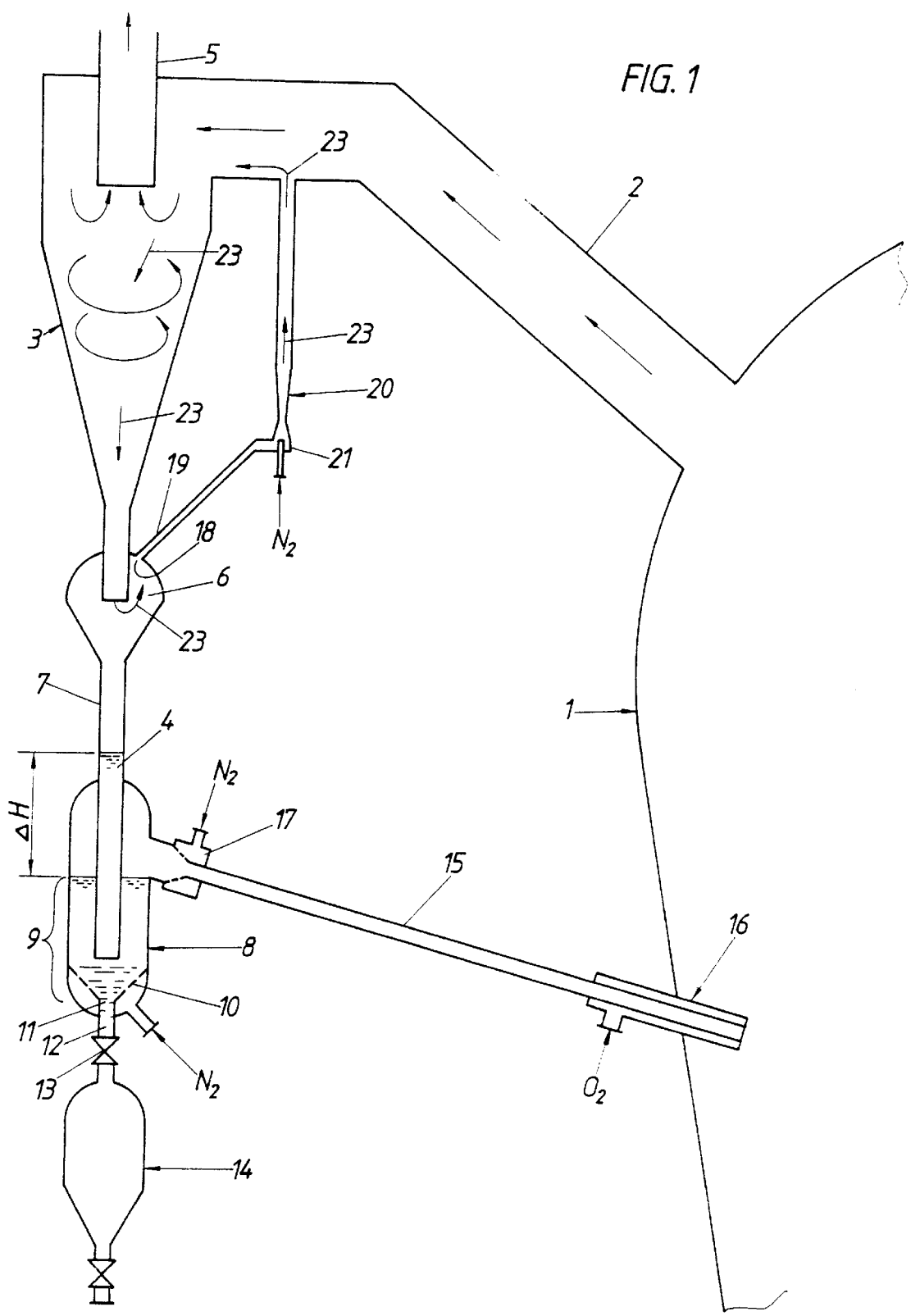
FIG. 1 illustrating a general view in schematic representation of an arrangement according to the invention for carrying out the process in accordance with the invention according to a first embodiment.

From a melter gasifier 1 that serves for melting sponge iron while simultaneously producing a reducing gas from a carbon-containing material, the offgas originating from coal gasification and subsequently employed as a reducing gas is discharged via a gas discharge duct 2 which opens into the melter gasifier 1 in an upper region of the same. Since fine-grained to dustlike solids are entrained along with the offgas, the offgas is supplied to a solids separator 3, which advantageously is constructed as a cyclone. The solids 4 that separate in the cyclone 3 sink downward, whereas the offgas is carried off upward via the discharge duct 5 departing from the cyclone 3.

From the cyclone 3 the separated solids 4 (predominantly coal particles, but also iron particles or iron-containing particles) pass into a killing space 6 that surrounds the exit area of the solids from the cyclone 3 in a pear-shaped manner in accordance with the illustrated exemplary embodiment. The settling solid particles sink downward via a solids discharge duct 7 leading onward from the killing space and in this way reach a collecting vessel 8 constructed in the marmer of a siphon. In the latter, a fluidized bed 9 is maintained by feeding a fluidizing gas, for example nitrogen. The bottom 10 of the collecting vessel is constructed such that it tapers downward and has a plurality of openings through which the fluidizing gas can stream upward in the amount and at the velocity required for the formation of eddies.

The cone-shaped taper of the bottom 10 ends in a central discharge opening 11, to which a discharge duct 12 provided with a shut-off valve 13 is connected. This discharge duct 12 opens into a sluicing-out vessel 14. This arrangement serves for conveying particularly coarse particles, for example parts of the refractory lining chipped off from the cyclone 3, out of the collecting vessel 8, so as not to interfere with the formation of the fluidized bed 9 in the collecting vessel 8.

From the collecting vessel 8 a solids recycling duct 15 leads into the melter gasifier 1, with the opening of the solids recycling duct 15 into the melter gasifier 1 being constructed as a burner 16, for example an oxygen burner. In order to uniformly convey the solid particles collecting in the collecting vessel 8 to the burner 16, the particles are conveyed through the solids recycling duct 15 by a conveying gas that is fed in at the beginning of the solids recycling duct 15 by means of a conveying-gas admixing means 17. Here, nitrogen may also be used as the conveying gas.

In the upper region of the killing space 6 there is provided a mouth 18 of a gas suction unit 19 of a gas circulating duct 20, which via a gas injector 21—advantageously also operated with nitrogen—in turn runs into the gas discharge duct 2 conducting the offgas from the melter gasifier 1 to the cyclone 3. Hereby an additional gas stream—illustrated by the arrows 23—is maintained by the cyclone 3, which prevents the fluidizing or the conveying gas respectively from rising from the collecting vessel 8 through the cyclone 3 and hampering the separation of the solid particles there. This additional gas stream causes a downward-oriented gas flow in the cyclone 3, by which the separating efficiency of the cyclone 3 is enhanced.

As can be seen from the drawing, there is a difference of level ΔH between the fluidized bed 9 that forms in the collecting vessel 8 and the solid particles that are fed to the same via the solids discharge duct 7 and accumulate, that balances the pressure loss between the cyclone 3 and the recycling position, i.e. the burner 16.

Recycling of the solid particles via a burner 16 is particularly advantageous, since hereby it becomes feasible to utilize the energy of the combustible solid particles and agglomerate the ash resulting thereby, for example by means of the iron-containing particles contained in the separated solids. The thus agglomerated ash sinks down inside the melter gasifier 1 and is melted or incorporated into a slag. Repeated discharging from the melter gasifier 1 of the solid particles separated in the cyclone 3 and recircled is hereby avoided.

FIGS. 2 to 5 show different embodiments of collecting vessels 8 that make it feasible to keep up a difference of level ΔH in a particularly advantageous manner. In accordance with FIG. 2, the collecting vessel 8 is constructed in the shape of an H, the vertical vessel parts 8', 8"connected by a horizontal vessel part 8'" exhibiting different lengths that correspond to the difference of level ΔH. Each of the two vertical vessel parts 8', 8" at its lower end is provided with a separate gas feed duct 24 for a fluidizing gas, such as nitrogen, for forming a fluidized bed 9. The horizontally oriented vessel part 8'" is arranged close to the lower ends of the vertically oriented vessel parts 8' and 8".

Since the height of the fluidized bed 9 in the vessel parts 8', 8" is of pronouncedly different heights—in the technical construction ΔH can be as much as several meters—it is advantageous with respect to fluidization to operate fluidized beds at different superficial velocities and thus with different amounts of gas in each of the vessel parts 8', 8".

In accordance with the embodiment illustrated in FIG. 3 the vertical vessel parts 8', 8" are arranged contiguously, and in the bottom area, in which a perforated bottom 10 is arranged for feeding gas, a connecting opening 25 is provided.

In FIGS. 4 and 5 embodiments of the bottom area parts of the vertical vessel parts 8', 8" are illustrated, in each of which the gas supply for the fluidizing gas is constructed in such a manner that coarse particles, which cannot be fluidized, can be conveyed out of the collecting vessel 8.

The bottom 10 can be constructed as a sieve bottom, wind box or as a stirring brick.

The invention is not limited to the described exemplary embodiment, but can be modified in various respects. Particularly it is applicable for reactor vessels of every type, in which discharging of solids by an offgas takes place—hence not only for melter gasifiers.

What is claimed is:

1. A process for recycling fine-particle solids (4) discharged by means of a first conveying gas from a reactor vessel (1) at a discharging position of the reactor vessel (1), wherein the fine-particle solids (4) are separated in a solids separator (3), are passed through an exit area (6) of said solids separator (3), are subsequently collected in a collecting vessel (8), and, from said collecting vessel (8), are recycled into the reactor vessel (1) by means of a second conveying gas while maintaining a difference in pressure between the solids separator (3) and an opening in the reactor vessel (1), and wherein a third conveying gas stream (23) is conducted through the solids separator (3) in a circuit towards the collecting vessel (8).

2. A process according to claim 1, wherein, in the exit area (6) for the solids (4), said third conveying gas stream (23) is sucked off and this gas, together with a fourth conveying gas, is supplied directly to the solids separator (3) along with the first conveying gas and solids that originate in the reactor vessel (1).

3. A process according to claim 2, wherein, in the exit area (6) of the solids separator (3), killing of the solids (4) is effected in a killing space (6) and the gas for the third conveying gas stream (23) is sucked out of the killing space (6) substantially free from solid particles.

4. A process according to claim 1, characterized in that a fluidized bed (9) is maintained in the collecting vessel (8) that serves for collecting separated solids, wherein the fine-particle solids (4) are charged into the fluidized bed (9) in a lower area of said fluidized bed (9).

5. A process according to claim 4, wherein the solids (4) are conducted from the fluidized bed (9) to a burner (16) by the second conveying gas.

6. A process according to claim 1, wherein the solids (4) separated in the solids separator (3) are charged into the reactor vessel (1) via a burner (16).

7. A process according to claim 6, wherein the ash of the solids (4) is agglomerated by combusting the solids (4).

8. A process according to claim 1, wherein the fine particle solids are coal dust.

9. A process according to claim 1, wherein the reactor vessel is a melter gasifier.

10. A process according to claim 1, wherein the solids separator is a cyclone.

11. An arrangement for recycling fine-particle solids discharged from a reactor vessel, said arrangement comprising a reactor vessel (1), a gas discharge duct (2) connected to the reactor vessel and leading to a solids separator (3), said solids separator (3) connected to a solids discharge duct (7) for conducting the separated solids (4) from the solids separator (3) to a collecting vessel (8), a solids recycling duct (15) connected to the collecting vessel (8) and leading into the reactor vessel (1), wherein a gas circulating duct (20) is connected in parallel with the solids separator (3) and is provided with a gas injector (21) that sucks off gas from one end of the solids separator (3) and conducts said gas back into the other end of the solids separator (3).

12. An arrangement according to claim 9, wherein an exit area of the solids (4) from the solids separator (3) is provided with a killing space (6) into which a solids discharge duct of the solids separator (3) opens, the mouth (18) of the solids discharge duct being arranged in the interior of the killing space (6), and a gas suction unit (19) of the gas circulating duct (20) departing from the killing space (6) at a distance above the mouth (18).

13. An arrangement according to claim 11, characterized in that a pressure gas duct producing a fluidized bed (9) within the collecting vessel (8) opens into the collecting vessel (8) while the solids discharge duct (7) departing from the solids separator (3) opens into the lower area of the fluidized bed (9).

14. An arrangement according to claim 13, characterized in that the collecting vessel (8) is at its bottom (10) provided with a bottom opening (11), said bottom opening (11) being provided with shut-off means (13), said bottom opening leading into a sluicing-out vessel (14), the bottom (10) of the collecting vessel (8) being constructed so as to taper downward from the top toward the bottom opening (11).

15. An arrangement according to claim 11, wherein the solids recycling duct (15) is provided with a gas injector.

16. An arrangement according to claim 11 wherein the solids recycling duct (15) is provided with a burner (16) leading into the reactor vessel (1).

17. An arrangement according to claim 11, characterized in that the collecting vessel (8) comprises two tube-shaped vertical vessel parts (8', 8") of different lengths, said tube-shaped vertical vessel parts being flow-connected with each other at their lower ends.

18. An arrangement according to claim 17, characterized in that the lower ends of the tube-shaped vertical vessel parts (8', 8") are each provided with an opening for a fluidizing gas.

19. An arrangement according to claim 17, characterized in that the collecting vessel (8) is of an H-shaped construction, with the tube-shaped vertical vessel parts (8', 8") being connected to each other by a horizontal vessel part (8'").

20. An arrangement according to claim 11, wherein the solids separator is a cyclone.

* * * * *